United States Patent [19]

Gesemann et al.

[11] Patent Number: 4,728,562

[45] Date of Patent: Mar. 1, 1988

[54] DIELECTRIC COMPOSITION

[75] Inventors: Hans-Jürgen Gesemann, Karl Marx Stadt; Mary Krawietz; Winfried Schaffrath, both of Dresden, all of German Democratic Rep.

[73] Assignee: Akademie der Wissenschaften der DDR, Berlin, German Democratic Rep.

[21] Appl. No.: 738,022

[22] Filed: May 24, 1985

[30] Foreign Application Priority Data

May 28, 1984 [DD] German Democratic Rep. .................................... 2634363

[51] Int. Cl.[4] .............................................. C04B 33/26

[52] U.S. Cl. .................................... 428/209; 428/210; 428/901; 252/514

[58] Field of Search ............................ 501/74; 357/68; 428/209, 210, 901; 252/514

[56] References Cited

U.S. PATENT DOCUMENTS

| | | | |
|---|---|---|---|
| 3,977,887 | 8/1976 | McIntosh | 501/74 X |
| 4,047,214 | 9/1977 | Francombe et al. | 357/68 X |

OTHER PUBLICATIONS

C.A., vol. 78, 1973, No. 35200c.

*Primary Examiner*—Nancy A. B. Swisher
*Attorney, Agent, or Firm*—Michael J. Striker

[57] ABSTRACT

The invention relates to a dielectric composition which, in particular, is useable in the thick layer technology for making printed condensers by means of the screen printing process. The composition contains as a dielectric active substance $Bi_2[A_{2-x}{}^{a+}Nb_x]$, whereby the condition $a(2-x)+5x=8$ is applied and A are one of a plurality of metal ions from the group $Mg^{2+}$,$Ni^{2+}$,$Zn^{2+}$,$Co^{2+}$,$Ca^{2+}$,$Sn^{2+}$,$Mn^{2+}$,$Co^{3+}$$Mn^{3+}$,$Al^{3+}$ and $Cr^{3+}$.

10 Claims, No Drawings

DIELECTRIC COMPOSITION

The invention relates to the field of the electrotechnology/electronic, in particular to the microelectronic and relates to a dielectric compositions which is usable, in particular in the thick layer technology for making printented condensators by means of the screen printing process.

For realizing condensors in circuits of the microelectronic multilayer chip condensers, but also printed condensers are used in the building blocks. The latter is particularly advantageous when a plurality of condensers of the same type of material are present on a circuit. Compromises must be made with thick layers condensers. One differentiates essentially two groups which are characterized as follows:

| | Type I | Type II |
|---|---|---|
| Face capacity | 10-200 pf/$cm^2$ | 1-20 nF/$cm^2$ |
| Loss factor tan (1 kHz,25° C.) | $50 \cdot 10^{-4}$ | <350 |
| Temperature coefficient $TK_c$ (0 to 70° C.) | ±30 ppm to −470 ppm 1 | ±7.5% |

While for type II ferroelectric perowskite in glass or with a low sinter temperature are used, the variety of materials for the dielectra of type I is much more extensive. In some cases active substances like $MgSio_3$, $MgTiO_3$, $MgO—TiO_2—ZrO_2$, $CaTiO_3$, $TiO_2$, among others, are imbedded in glasses of the most different composition.

Also known are low melting (sintering) oxide mixtures (sintering temperatures around 950° C.), which result in crystallizing glasses with a relative high dielectricity constant $\epsilon$, for example, the systems $Bi_2O_3—CdO—SiO_2$, $Bi_2O_3—PbO—B_2O_3$ and $PbO—SiO_2—ZnO—Al_2O_3$.

Face capacities above 200 pF/$cm^2$ are rarely reached. However, if this is the case, larger instabilities (aging, temperature hysteresis, $TK_c$-values above 2% and others) must be tolerated. An of 43 is known for a condenser with a $TK_c$ being smaller than 100 ppm, which has the stability required in accordance with type I and which has a corresponding low sinter temperature of about 950° C.

It is an object of the invention to develop a dielectric composition for making printed condensers which assures the making of condensers with the following parameters:

| | | |
|---|---|---|
| (a) | face capacity | >200 pF/$cm^2$ |
| (b) | temperature coefficient $TK_c$ (−25 to +85° C.) | <100 ppm |
| (c) | Loss factor tan $\delta$ (1 kHz, 20° C.) | $<50 \cdot 10^{-4}$ |
| (d) | insulation resistance $R_{is}$ (20° C.) | $>5 \cdot 10^{10}\Omega$ |
| (e) | puncture field strength | >500 V |
| (f) | aging of C (1000 hrs.) | >0.5° |

Furthermore, a paste which is to be made with the dielectric composition should be sinterable at temperatures between 1000° C. and can be compatible with customary Ag/Pd compatible pastes.

This object is solved with a dielectric active substance consisting of $Bi_2[A_{2-x}{}^{a+}Nb_x]O_7$, whereby the condition $a(2-x)+5x=8$ applies and A are one or a plurality of metal ions from the group of $Mg^{2+}$, $Ni^{2+}$, $Zn^{2+}$, $CO^{2+}$, $Fe^{2+}$, $Ca^{2+}$, $SN^{2+}$, $Mn^{2+}$, $Co^{3+}$, $Fe^{3+}$, $Mn^{3+}$, $Al^{3+}$, and $Cr^{3+}$. Advantageously the active substance may consist of $Bi_2[Mg_{2/3}Nb_{4/3}]O_7$ or $Bi_2[Zn_{2/3}Nb_{4/3}]O_7$ or $Bi_2[FeNb]O_7$ or a mixture of the same.

In accordance with the invention this active substance forms a screen printing capable paste in an amount of up to 83% substance in a binder for making dielectric elements which are closed in themselves. The paste may contain up to 3% substance manganese as well as up to 20% substance of low melting glass with a softening point below 900° C. with respect to the active substance.

Preferably, the already known system ethyl cellulose in terpinol is suitable as a binder for such purposes. However, it is also possible to use other known binders which contains, for example, polymethyl acrylate or polyvinyl acetobutyrate in alphatic alcohols, esters and terpines as solvents.

The invention also encompasses condensors and multilayer condenser arrangements which are made in the screen printing process with the inventive pate, wherein the dielectric films consist of 77 to 100% substance of a dielectric active substance from $Bi_2[A_{2-x}{}^{a+}Nb_x]O_7$, whereby the condition $a(2-x)+5x=8$ applies and A are one or a plurality of metal ions from the group $Mg^{2+}$, $Ni^{2+}$, $Zn^{2+}$, $Co^{2+}$, $Fe^{2+}$, $Ca^{2+}$, $Ca^{2+}$, $Sn^{2+}$, $Mn^{2+}$, $Co^{3+}$, $Fe^{3+}$, $Mn^{3+}$, $Al^{3+}$ and $Cr^{3+}$. Up to 3% substance manganese as well as up to 20% substance of low melting glass with a softening point below 900° C. may be contained in the dielectric films. Advantageously, the active substances may consist of $Bi_2[Mg_{2/3}Nb_{4/4}]O_7$ or $Bi_2[Zn_{2/3}Nb_{4/3}]O_7$ or $Bi_2[FeNb]O_7$ or a mixture of the same.

The condensors which are made with the dielectric composition have a high face capacity of >2.7 nF/$cm^2$. Extremely favorable stability parameters are achieved in conjunction with this high face capacity, namely

| | | |
|---|---|---|
| (a) | $TK_c$ (−55 to +125° C.) (−25 to +85° C.) | <100 ppm/K <60 ppm/K |
| (b) | aging of C (1000 hrs) | <0.5% |
| (c) | field density dependency at 100 V/25 μm (sintered dielectric film thickness) | <1% |
| (d) | frequency dependency of C in the range of 1 kHz-10 MHz | <2% |

Further advantages are the selfhealing during punctures and the possibility to adjust positive and negative $TK_c$-values. The loss factor tan $\delta$ and the insulation resistance $R_{is}$ correspond to the customary requirements for condensers.

The invention is explained in more detail with the following exemplified embodiments.

EXAMPLE 1

The example relates to a paste which consists of 80 percent substance of the dielectric active substance $Bi_2[Mg_{2/3}Nb_{4/3}]O_7$ and 20 percent substance of a binder. Ethyl cellulose in terpinol serves as a binder. Condensers may be made with this dielectric paste with the customary technological equipments and methods on customary substrates. In the subject example, AlSiMg-substrates are used. An Ag/Pd paste is at first applied to this substrate as a base electrode and is sintered at 850° C. A 25 μm thick first dielectric film is applied thereon with the dielectric paste in the screen printing process and is sintered at 850° C. Thereafter, a second dielectric film of the dielectric paste is applied with a thickness of also 25 μm and sintered at 950° C. Finally, an Ag/Pd paste is printed thereon as a cover electrode and sintered at 850° C. The condensers made in this manner with a dielectric thickness of 30 μm (after sintering) and a face of 56 $mm^2$ have the following data:

| | |
|---|---|
| capacity C | 2.2 nF |
| loss factor tan δ | $<50 \cdot 10^{-4}$ |
| insulation resistance $R_{is}$ | $>5 \cdot 10^{10}\Omega$ |
| puncture field density | >600 V |
| $TK_c$ (−25 to +85° C.) | −60 ppm/K |
| aging of C (1000 hrs.) | <0.5% |

The result states that with this dielectric paste the best known dielectric pastes of similar face capacity may be rendered superior in the stability parameters. The adhereability of the printed condensors is sufficient and they survive large temperature drops without cracks.

EXAMPLE 2

The example relates to a dielectric paste with the active substance $Bi_2[FeNb]O_7$ by adding glass of the system $PbO—SiO_2—Al_2O_3$. After synthesis of the pyrochchlor phase the glass is added in a part of 5% substance. The inorganic parts are mixed into a paste with a binder, consisting of ethyl cellulose in terinol. The solid/binder ratio is about 80/20. The following layer sequence is generated:

application of a first dielectric film with the aforedescribed paste onto an insulating substrate by using the screen printing process and sintering at 920° C., printing of a base electrode on the dielectric film with an Ag/Pd paste and sintering at 920° C., printing of a second and thereupon a third dielectric film with the aforedescribed paste on the base electrode and a sintering at 940° C., printing of a cover electrode with an Ag/Pd paste and sintering at 850° C.

The condensers which were made in this manner with an active dielectric thickness of 30 μm (after sintering) and an electrode face of 56 $mm_2$ have the following data:

| | |
|---|---|
| capacity | 2.3 nF |
| loss factor tan δ | $<80 \cdot 10^{-4}$ |
| insulation factor resistance $R_{is}$ | $>5 \cdot 10^{10}\Omega$ |
| puncture field density | >600 V |
| $TK_c$ (−25 to +85° C. | +100 ppm/K |
| aging of C (1000 hrs.) | <0.5° |

EXAMPLE 3

The example relates to a multilayer condenser arrangement by using the active substance $Bi_2[Zn_{2/3}Nb_{4/3}]O_7$ by adding glass of the system $ZnO—B_2O_3—SiO_2$. After mixing a paste as described in example 2, a plurality of condensors are printed in a parallel circuit superimposed with respect to each other. For this purpose the electrodes are alternately printed offset with respect to each other. The dielectric film consists of two each printing layers. After each second printing a "height balance printing" must be performed for the electrodes. Thus, a total of 6 condensers are printed superimposed with respect to each other in a parallel circuit. The multilayer condenser arrangement has the following characteristics:

| | |
|---|---|
| capacity C | 6.2 nF |
| loss factor tan δ | $50 \cdot 10^{-4}$ |
| insulation resistor $R_{is}$ | $>5 \cdot 10^{10}\Omega$ |
| puncture field density | 500 V |
| $TK_c$ (−25 to +85° C.) | 50 ppm/K |
| aging of C (1000 hrs) | <0.5% |

We claim:

1. Dielectric active substance for making dielectric elements, consisting of $Bi_2[A_{2-x}{}^{a+}Nb_x]O_7$, wherein $a(2-x)+5x=8$ and A is one or a plurality of metal ions selected from the group consisting of $Mg^{2+}$, $Ni^{2+}$, $Zn^{2+}$, $Co^{2+}$, $Ca^{2+}$, $Sn^{2+}$, $Mn^{2+}$, $Co^{3+}$, $Mn^{3+}$, $Al^{3+}$ and $Cr^{3+}$.

2. Active substance in accordance with claim 1, consisting of $Bi_2[Mg_{2/3}Nb_{4/3}]O_7$, $Bi_2[Zn_{2/3}Nb_{4/3}]O_7$, $Bi_2[AlNb]O_7$ or a mixture thereof.

3. Screen printable dielectric paste for making dielectric elements, containing a dielectric active substance in a binder, the active substance consisting of $Bi_2[A_{2-x}{}^{a+}Nb_x]O_7$, wherein $a(2-x)+5x=8$ and A are one or a plurality of metal ions selected from the group consisting of $Mg^{2+}$, $Ni^{2+}$, $Zn^{2+}$, $Co^{2+}$, $Ca^{2+}$, $Sn^{2+}$, $Mn^{2+}$, $Co^{3+}$, $Mn^{3+}$, $Al^{3+}$ and $Cr^{3+}$, the active substance being contained to an extent up to 83% in the binder and the paste also containing 0 to 3% of the amount of the active substance manganese as well as 0 to 20% of the amount of the active substance of low melting glass with a softening point below 900° C.

4. Paste in accordance with claim 3, wherein said low melting glass is selected from the group consisting of $PbSiO_3$, $PbO—B_2O_3—SiO_2$, $Zn—B_2O_3—SiO_2$, $Pb—Al_2O_3$ or a mixture thereof.

5. Condenser, consisting of an electrically insulating substrate, a first electrically conductive layer printed onto said electrically insulating substrate by means of screen printing, one or a plurality of superimposed dielectric films printed on said conductive layer by means of screen printing and a second electrically conductive layer printed by means of screen printing onto said dielectric film, said dielectric film consisting from 77 to 100% of a dielectric active substance of $Bi[A_{2-x}{}^{a+}Nb_x]O_7$, wherein $a(2-x)+5_x=8$ and A are one or a plurality of metal ions selected from the group consisting of $Mg^{2+}$, $Ni^{2+}$, $Zn^{2+}$, $Co^{2+}$, $Ca^{2+}$, $Sn^{2+}$, $Mn^{2+}$, $Co^{3+}$, $Mn^{3+}$, $Al^{3+}$, and $Cr^{3+}$, 0 to 3% of the amount of dielectric active substance of low melting glass with a softening point below 900° C.

6. Condenser in accordance with claim 5, wherein the active substance is selected from the group consisting of $Bi_2[Mg_{2/3}Nb_{4/3}]O_7$, $Bi_2[Zn_{2/3}Nb_{4/3}]O_7$, $Bi_2[AlNb]O_7$ or a mixture thereof.

7. Condenser, consisting of an electrically insulating substrate, a first dielectric film printed onto said electrically insulating substrate by means of screen printing, a first electrically conductive layer printed onto this film by means of screen printing, one or a plurality of further dielectric films printed onto this layer by means of screen printing and a second conductive layer printed onto said further dielectric film or films by means of screen printing, said dielectric films consisting from 77 to 100% of a dielectric active substance of $Bi_2[A_{2-x}{}^{a+}Nb_x]O_7$, wherein $a(2-x)+5x=8$ and A are one or a plurality of metal ions selected from the group consisting of $Mg^{2+}$, $Ni^{2+}$, $Zn^{2+}$, $Co^{2+}$, $Ca^{2+}$, $Sn^{2+}$, $Mn^{2+}$, $Co^{3+}$, $Mn^{3+}$, $Al^{3+}$ and $Cr^{3+}$, 0 to 3% of the amount of dielectric active substance of manganese, as well as 0 to 20% of the amount of dielectric active substance of low melting glass with a softening point below 900° C.

8. Condenser in accordance with claim 7, wherein the active substance is selected from the group consisting of $Bi_2[Mg_{2/3}Nb_{4/3}]O_7$, $Bi_2[Zn_{2/3}Nb_{4/3}]O_7$, $Bi_2[AlNb]O_7$ or a mixture thereof.

9. Multilayer condenser arrangement of individual condensers electrically switched parallel with respect to each other, printed superimposed with each other by means of the screen printing, consisting of more than two electrically conductive layers and a plurality of dielectric films, the dielectric films consisting from 77 to 100% of a dielectric active substance of $Bi_2[A_{2-x}{}^{a+}Nb_x]O_7$, wherein $a(2-x)+5x=8$ and A are one or a plurality of metal ions selected from the group consisting of $Mg^{2+}$, $Ni^{2+}$, $Zn^{2+}$, $Co^{2+}$, $Ca^{2+}$, $Sn^{2+}$, $Mn^{2+}$, $Co^{3+}$, $Mn^{3+}$, $Al^{3+}$ and $Cr^{3+}$, 0 to 3% of the amount of dielectric active substance of manganese, as well as 0 to 20% of the amount of dielectric active substance of low melting glass with a softening point below 900° C.

10. Multilayer condenser arrangement in accordance with claim 9, wherein the active substance is selected from the group consisting of $Bi_2[Mg_{2/3}Nb_{4/3}]O_7$, $Bi_2[Zn_{2/3}Nb_{4/3}]O_7$, $Bi_2[AlNb]O_7$ or a mixture thereof.

* * * * *